United States Patent [19]

Penger

[11] Patent Number: 5,595,329
[45] Date of Patent: Jan. 21, 1997

[54] APPARATUS FOR WELDING PROFILE BODIES ONTO PLANAR BODIES

[75] Inventor: Georg Penger, Oberappersdorf, Germany

[73] Assignee: Anton Steinecker Entwicklungs GmbH & Co., Germany

[21] Appl. No.: 398,014

[22] Filed: Mar. 3, 1995

[30] Foreign Application Priority Data

Mar. 4, 1994 [DE] Germany .............................. 9403709 U

[51] Int. Cl.$^6$ ................................................ B23K 37/00
[52] U.S. Cl. ............................................ 228/9; 219/124.34
[58] Field of Search .................... 228/9, 102; 219/124.1, 219/124.33, 124.34

[56] References Cited

U.S. PATENT DOCUMENTS

| | | | |
|---|---|---|---|
| 3,871,567 | 3/1975 | Ishida | 219/124.33 X |
| 4,040,557 | 8/1977 | Heverly | 228/9 |
| 4,192,986 | 3/1980 | Udagawa et al. | 228/9 X |
| 4,750,663 | 6/1988 | Warczak | 219/124.34 X |
| 5,015,821 | 5/1991 | Sartorio et al. | 219/124.34 |
| 5,070,792 | 12/1991 | Harris | 105/29.1 |
| 5,146,064 | 9/1992 | Poirier | 219/124.34 |

FOREIGN PATENT DOCUMENTS 642583 4/1984 Switzerland .
WO88/03456 5/1988 WIPO .

*Primary Examiner*—Kenneth J. Ramsey
*Attorney, Agent, or Firm*—Seed and Berry LLP

[57] ABSTRACT

The present invention relates to an apparatus for welding profile bodies onto planar bodies, in particular flat bodies, with at least one welding torch head. To simplify the welding of profile bodies to planar bodies, the positional assignment of the welding torch head to the weld seam is defined according to the invention by a profiled seam detector whose profile shape is adapted to the profile of the profile body, the seam detector being adapted to be activated towards the profile body and being provided with rolls through which it can be supported on the profile body.

13 Claims, 2 Drawing Sheets

APPARATUS FOR WELDING PROFILE BODIES ONTO PLANAR BODIES

TECHNICAL FIELD

The present invention relates to an apparatus for welding profile bodies onto planar or cylindrical bodies, with at least one welding torch head.

BACKGROUND OF THE INVENTION

Profile bodies are often still welded by hand to planar bodies, in particular curved and large-surface bodies, since prior art devices which would permit an automatic welding operation are very expensive. The problems regarding the welding of profile bodies to planar bodies arise, for instance, whenever in the making of brewing vessels, or the like, which are needed in brewhouses, heating frames consisting of profile bodies, such as angles, have to be welded onto the circumference of the wall of the brewing vessel. The diameter of the brewing vessels may range from 2 m to 7 m. It is thus troublesome to weld profile bodies extending on the outer circumference as heating frames. Nowadays the heating frames are normally attached to the outer wall in prefixed fashion, and a circumferential welding operation which is carried out by hand is then performed in general. The problems equally arise when such heating frames are to be welded in the form of profile bodies onto the bottom, in particular onto a bulging or curved bottom.

SUMMARY OF THE INVENTION

It is therefore the object of the present invention to provide an apparatus for welding profile bodies to planar bodies, in particular curved planar bodies, in a much easier way than has so far been the case.

To attain such an object, the apparatus of the present invention provides positional adjustment of a welding torch head to a weld seam by a profiled seam detector whose profile shape is adapted to the profile of the profile body, with the seam detector being urged towards the profile body and provided with rolls on which the seam detector is supported on the profile body.

In accordance with a preferred embodiment of the present invention, the position of the welding torch head is defined by a profiled seam detector which thereby defines the position of the weld seam to be produced. The seam detector at least partially has a profile that corresponds to the profile of the profile body, so that the seam detector can be placed against the profile body, thereby surrounding the profile body and sensing the position of the profile body relative to the planar body. The exact position of the profile body is detected, when the seam detector is placed against the profile body, by rolls that are arranged in the seam detector. The rolls are positioned to contact the outer surface of the profile body. The welding torch head is coupled to the seam detector such that the corresponding alignment of the seam detector, relative to the planar body and the profile body, is then transmitted automatically to the welding torch head, whereby an automatic positioning of the welding torch head occurs. Upon activation of the welding torch head, the planar body need only be brought into relative movement with respect to the seam detector, so that the profile body is then continuously welded onto the planar body when moving past the welding torch head.

In an advantageous development of the preferred embodiment of the present invention, the apparatus includes a holding arm and the seam detector is replaceably arranged on the holding arm. The profile of the seam detector on the apparatus can thus be adapted by replacement in an optimum manner to correspond to the shape of the profile body. When the profile bodies are angle profile bodies, the seam detector has an angular cross-section, and the rolls on the seam detector are preferably prism rolls.

In an advantageous development of this embodiment, the seam detector has inner surfaces that face the profile body, and each inner surface has two rolls that are spaced apart in the direction of extension of the weld seam. This arrangement of the rolls provides exact sensing by and positioning of the seam detector on the profile body. The seam detector can be urged towards the profile body with different means, including, as an example, electrohydraulically, or also pneumatically, with a pneumatic contact-pressure means being especially preferred for the seam detector.

In an advantageous development of the preferred embodiment, the apparatus includes a cross slide that is movable relative to the planar body, and the seam detector and the welding head are arranged on the cross slide. The seam detector moves the cross slide and the movement is transmitted onto the welding head, so that the seam detector determines the position of the welding head via the cross slide. In an advantageous development of the invention, two seam detectors are arranged on the cross slide by a pair of holding arms for simultaneously welding two spaced-apart weld seams so as to increase the performance in particular. For instance, during the welding of heating frames, two heating angles can then be welded on the outer circumference to the wall of the vessel at the same time. To be able to compensate for positional tolerances, the two holding arms are independently movable along the cross slides, such that the distance between the two seam detectors is variable.

In another advantageous development of the invention, a sensor is arranged in the area of the seam detector for sensing holes or attachments in the profile body. The sensor is operatively coupled to the welding apparatus and the sensor detects whether the weld seam to be produced should be interrupted, for instance, when the end of the profile body being welded to the planar body is reached, or when the profile body includes holes on which no weld seam is to be produced. In such a case, the sensor will switch off the welding apparatus automatically.

In another advantageous development, the seam detector is pivotally connected to the associated holding arm such that the seam detector is pivotable about a vertical axis. This pivotal arrangement makes it possible to adapt the position of the seam detector relative to the profile body and relative to the planar body in an optimum manner. A locking apparatus for locking the pivotal position of the seam detector is provided on the holding arm and connected to the seam detector. Such a locking apparatus makes it possible to lock the respective pivotal position of the seam detector, for instance, whenever the seam detector has reached the end of a profile and is already positioned outside the profile with its leading rolls. To permit a welding operation until the end, the seam detector can be locked, so that it maintains its position also without any support.

BRIEF DESCRIPTION OF THE DRAWINGS

The invention shall now be explained with reference to the embodiments shown in the drawing, in which.

DETAILED DESCRIPTION OF THE INVENTION

Figure 1:
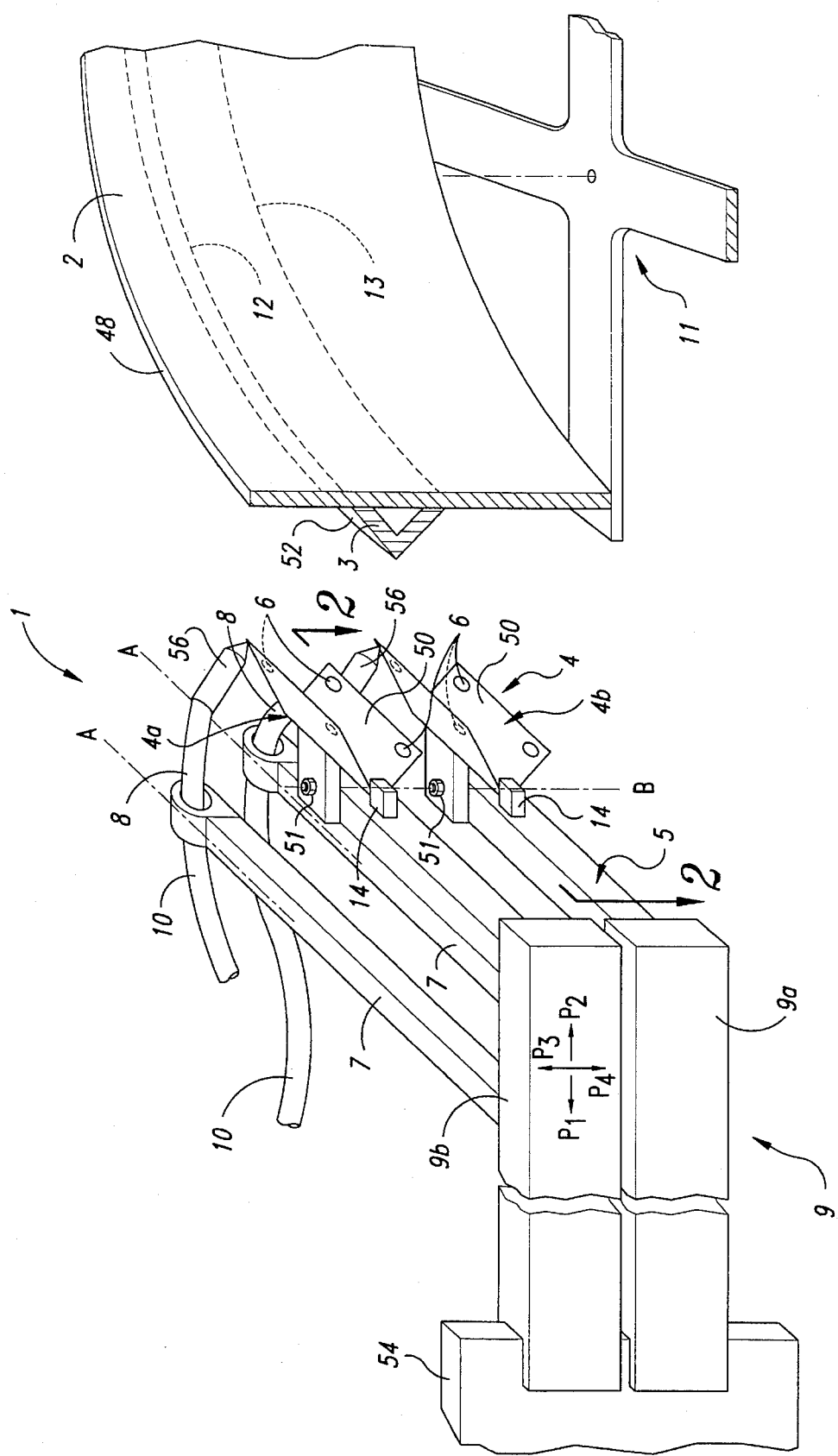
FIG. 1 is a diagrammatic perspective, partly sectional view of an apparatus according to a preferred embodiment of the present invention.

In FIG. 1, 1 designates the apparatus according to the invention on the whole. The apparatus serves to weld a profile body 3, such as an angle profile in the illustrated embodiment, to a planar body 2. The need for welding one or more of such profile bodies 3 to a planar body 2 arises, for instance, in the manufacture of brewing kettles. The profile bodies 3 serve as heating frames and conduct a heating medium, such as hot steam. In the illustrated embodiment, the profile body 3 is welded to an upright curved wall 48 of the planar body 2. The apparatus 1 of the invention can be used for welding one or more profile bodies 3 onto the planar body 2 such that each profile body connects to itself and provides an endless pathway around the planar body 2. The apparatus 1 of the present invention can also be used for welding one or more profile bodies 3 onto a planar body 2 in the form of spirals to convex or concave dished boiler ends, which is often necessary in the making of brewing vessels.

In the illustrated embodiment of FIG. 1, the apparatus 1 comprises two seam detectors 4a and 4b each having a cross-sectional profile that substantially corresponds to the cross-sectional profile of profile body 3. The seam detectors 4a and 4b are secured with a fastener 51 to holding arms 5 in a replaceable manner such that the seam detectors having a first profile can be replaced with one or more seam detectors with a second cross-sectional profile when, as an example, the profile of the particular profile body 3 being welded onto the planar body 2 changes from the first cross-sectional profile to a corresponding second cross-sectional profile.

The holding arms 5 extend from the seam detectors 4a and 4a and securely connect at an inner end to connect to a cross slide 9 that is movably adjustable relative to the planar body 2. The cross slide 9 includes a cross slide holding arm 9a and 9b for each of the holding arms 5 holding the respective seam detectors 4a and 4b in a selected position relative to the profile bodies 3.

Each of the seam detectors 4a and 4b have inner surfaces 50 that face toward the respective profile body 3 when the apparatus 1 is in a welding position. The inner surfaces 50 have prism rolls 6 thereon, positioned such that the prism rolls are supported on outer surfaces 52 of the profile bodies 3 during the welding operation, thereby sensing the outer surface of the profile bodies 3. The cross slide 9 is arranged on an extension arm of a conventional device carrier 54 and can be moved along arrows P1 to P4 horizontally and/or vertically. The displacement of the cross slide holding arms 9a and 9b is performed via a conventional pneumatic drive coupled to the device carrier 54. The holding arm 9a of cross slide 9 is supported relative to holding arm 9b in such a manner that the distance in the vertical position between the two arms can be varied, whereby the vertical position of the two seam detectors 4a and 4b, and the two seam detectors can operate at different distances relative to each other. Accordingly, the vertical position of each seam detector 4a and 4b is independently adjustable.

The apparatus 1 has torch holding arms 7 that are attached at one end to the cross slide holding arms 9a and 9b, and the opposite end of the torch holding arms securely hold welding torches 8 used during the welding process. Each of the torch holding arms 7 holds a welding torch 8 in a selected position such that a welding head 56 of the welding torch is securely positioned immediately adjacent to an edge of a respective seam detector 4a or 4b. Power is supplied to the welding torches 8 via corresponding supply lines 10 in a conventional manner.

Each of the welding torches 8 is retained on a respective holding arm 7 and arranged such that the welding torch can be adjusted about axis A in pendulum fashion. Possible tolerances can be compensated for by such an arrangement. The apparatus of the invention can now be operated as follows.

First of all, a planar body 2, such as the wall 48 of a brewing vessel, is positioned on a star-shaped carrier 11, and the profile bodies 3, such as angle profiles, are temporarily attached in a conventional manner to the planar body 2 at a few points. The device carrier 54, which has the welding apparatus 1 arranged thereon, moves the welding apparatus in the direction of arrow P2 at a suitable height toward the planar body 2 until each of the seam detectors 4a and 4b senses a respective one of the profile bodies 3. During said movement, the prism rolls 5 come to rest on the outer surface 52 of profile body 3. In the preferred embodiment, the seam detectors 4a and 4b automatically readjust their respective positions relative to the profile bodies 3 when the seam detectors are pressed into engagement with the profile bodies, such that automatic readjustment occurs in the direction of arrows P3, P4, or also P1, P2. Because each of the seam detectors 4a and 4b positions the respective holding arm 7 for the torch head 56 via cross slide 9, the position of the torch head 56 is automatically defined relative to the profile body and the planar body.

The welding operation is started by activating the respective torch head 56. The rotary device 11 is connected to a conventional drive member that rotates the rotary device and the planar body relative to the apparatus 1, thereby guiding a weld seam 12 to be produced between the profile body 3 and the planar body, past the respective torch head 56 in a suitable position. This operation can be carried out continuously. After the weld seam 12 has been finished, the cross slide 9 is moved away from the planar body in the direction of arrow P1 and the planar body can be repositioned. The apparatus is used to enable the torch head 56 to produce a lower weld seam 13 between the planar body 2 and the profile body 3 in the same manner.

To be able to find out where the profile body 3, such as the illustrated angle profile, has an interruption or where holes are located in the angle profile, a sensor 14 is assigned to each of the seam detectors 4a and 4b. The sensor 14 is coupled to the welding torch 8 in a conventional manner, and the sensor 14 monitors the surface 52 of the respective profile body 3. Whenever the sensor 14 senses that there is a gap in the profile body 3 or that the profile body has reaches its end, the sensor provides a signal to the welding torch 8 and the welding torch will switch off the torch head 56 automatically.

With the welding apparatus 1 of the invention, it is of course possible to perform not only circular welding operations, but also spiral ones, i.e., the apparatus can just as well be used for welding operations in which three profiles corresponding to the angle profile are to be welded spirally around planar bodies. In such an operation, the apparatus 1 moves in the direction of the P3 or P4 arrows as the planar body 2 and the profile bodies 3 are rotated past the apparatus.

Figure 2:
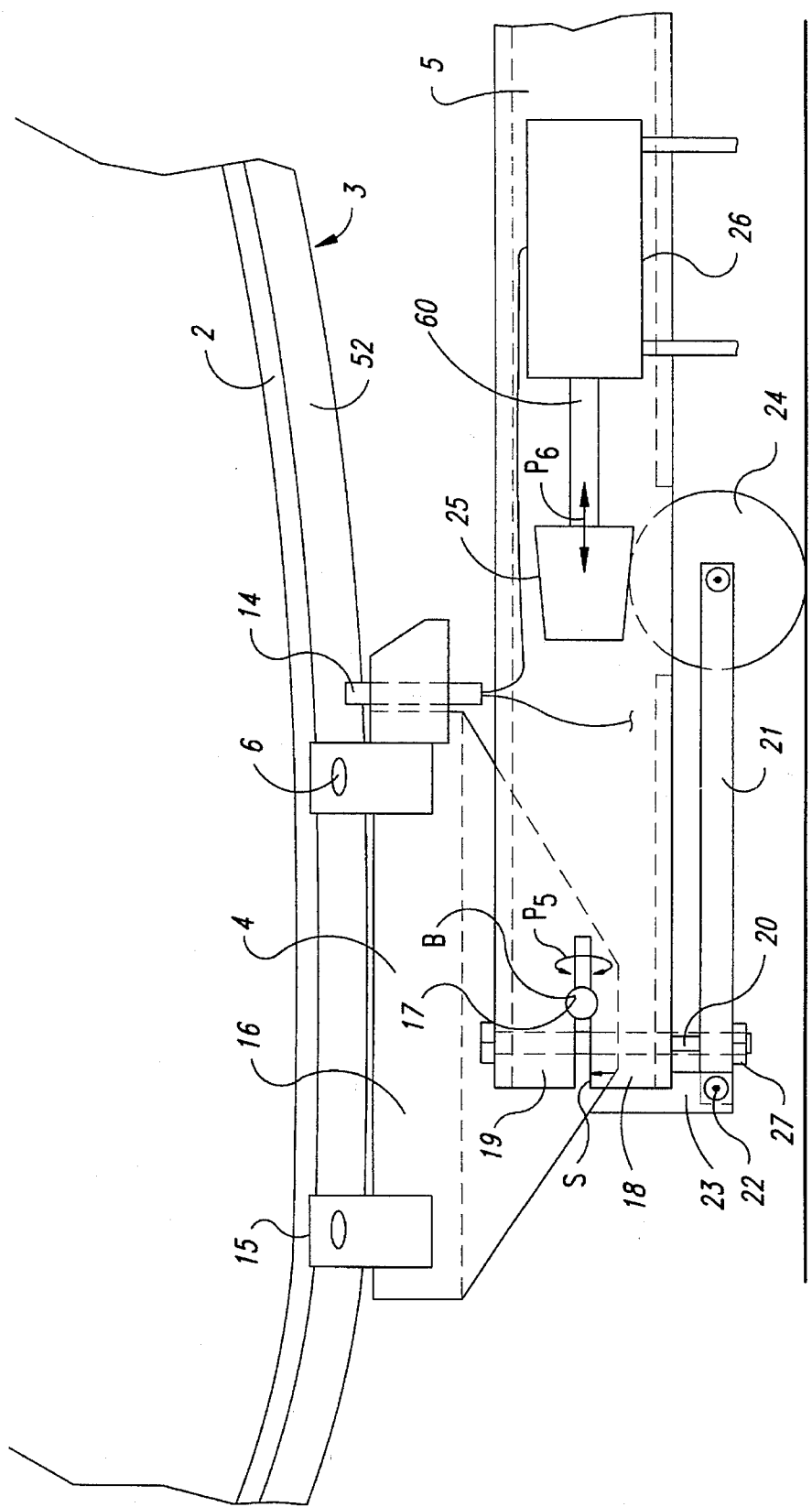
FIG. 2 is a top view approximately in the direction of arrow II of FIG. 1 illustrating a seam detector which is slightly modified in comparison with FIG. 1.

FIG. 2 is a partial top view, approximately in the direction of arrow II of FIGS. 1, which illustrates a holding arm 5 that carries a seam detector 4 arranged on the bottom side thereof in a modification of the embodiment of FIG. 1. In this embodiment, the prism rolls 6 are supported in supporting brackets 15 that are connected to the seam detector. The supporting brackets are arranged on profile surfaces 16 of the seam detector 4 such that the supporting brackets have a cross-sectional profile that substantially corresponds to the profile of the corresponding profile body 3. The seam detector 4 is pivotable about a vertical axis B in the direction of arrow P5 by means of a pivot bolt 17 that is connected to the seam detector 4 and extends through the outer end of the holding arm so that the seam detector can perform a certain pivotal movement relative to holding arm 5 1 and relative to the profile body 3 and planar body 2.

The outer end of holding arm 5 which faces the seam detector 4 is formed as a clamping member, with the clamping jaws 18 and 19 that are movable towards each other, as an example, by an axially moving clamping bolt 20 that extends through the clamping jaws, such that a space between the clamping jaws is increased or decreased, thereby unclamping or clamping the pivot bolt 17 therein-between. To be in a position to exert the pull on the clamping bolt 20, the clamping bolt is acted upon by a lever arm 21 which is supported pivotably at a pivot pin 22 relative to a fastening element 23 arranged on clamping jaw 18. The lever arm 21 carries a roll 24 at the other end opposite the pivot pin. The roll 24 is movably connected to a truncated element 25 that is connected to a rod 60 of a conventional pneumatic cylinder 26. The truncated element is movable in the direction of arrows P6 upon axially moving the rod 60 by activating the pneumatic cylinder 26.

In the preferred embodiment, the pneumatic cylinder 26 is operatively connected to the sensor 14, and the pneumatic cylinder receives a signal from the sensor, for example, when the sensor detects a hole in or an end of the profile body 3. Accordingly, the pneumatic cylinder 26 can be activated in response to the signal from sensor 14 so as to manipulate the position of the seam detector 4 relative to the planar body 2 and profile body 3.

During the normal welding operation, wherein all pairs of the rolls 6 of the seam detector 4 rest on the profile body 3 to be welded on, the seam detector is arranged on the holding arm 5 to be freely pivotable about axis B and can thus compensate for unevenness in the manner of a rocker and also easily follow different curvatures of the planar body on which the welding operation is to take place.

Whenever the sensor 14 senses that the end of a profile to be welded on has been reached, i.e., the prism roll 6 which can be seen at the right side in the drawing is brought out of engagement with the profile body with continuation of the relative movement between angle profile and welding apparatus, the sensor will supply a signal to the pneumatic cylinder 26. The pneumatic cylinder 26 activates the truncated element 25 toward the left side in the drawing, whereby the roll 24 is pressed away from the planar body 2. This movement of the roll 24 is transmitted to the lever arm 21 which, in turn, rotates clockwise about axis 22 and pulls the clamping bolt 20 via a nut 27 away from the planar body, so that the gap distance S between the two clamping jaws 18 and 19 is reduced. The pivot bolt 17 is clamped thereby, and the seam detector 4 is then locked or clamped in the occupied pivotal position, so that the welding operation can nevertheless be performed until the end, even if the prism roll 6, which is shown at the right side, is no longer supported on the angle profile.

On the whole, it is thereby easily possible to weld profile bodies continuously, especially to curved planar bodies. It is ensured, through the seam detection and the suspension on a cross slide and the pivotable suspension in the manner of a rocker of the seam detector on the associated holding arm, that positional and manufacturing tolerances can be compensated to a large extent and that the seam detector can easily follow different curvatures. The seam detector detects the respective position of the weld seam and controls the torch head accordingly.

What is claimed is:

1. Apparatus for welding profile bodies onto plane or cylindrical body surfaces, comprising at least one welding torch head, a positional assignment of said welding torch head to a weld seam being defined by a profiled seam detector whose profile shape is adapted to a profile shape of said profile body, said seam detector being adapted to be activated toward said profile body and being provided with rolls through which said seam detector can be supported on said profile body.

2. The apparatus according to claim 1 wherein said seam detector is replaceably arranged on a holding arm.

3. The apparatus according to claim 1 wherein said rolls are prism rolls.

4. The apparatus according to claim 1 wherein said profile bodies are angle profile bodies.

5. The apparatus according to claim 4 wherein said seam detectors have an angular cross-section.

6. The apparatus according to claim 1 wherein said seam detector has inner surfaces and is provided on each of its inner surfaces with two rolls that are spaced apart in a direction of extension of said weld seam.

7. The apparatus according to claim 1, further comprising a pneumatic contact-pressure device connected to said seam detector.

8. The apparatus according to claim 1 wherein said seam detector and said welding torch head are arranged on a cross slide.

9. The apparatus according to claim 8, further comprising two seam detectors arranged on said cross slide by holding arms for simultaneously welding along two spaced-apart weld seams.

10. The apparatus according to claim 9 wherein a distance between said two seam detectors is variable.

11. The apparatus according to claim 9 wherein said seam detector is arranged on the associated holding arm to be pivotable about a vertical axis.

12. The apparatus according to claim 11, further comprising a clamping apparatus attached to at least one of said holding arms, said clamping apparatus releasably securing said seam detector on said holding arm in a pivotal position relative to said holding arm.

13. The apparatus according to claim 1 wherein a sensor is arranged in the area of said seam detector for sensing holes or attachments in said profile body.

\* \* \* \* \*